United States Patent
Kerzendorf et al.

(10) Patent No.: US 7,031,780 B2
(45) Date of Patent: Apr. 18, 2006

(54) SENSOR SYSTEM AND METHOD FOR DETERMINING SYSTEM STATES

(75) Inventors: Werner Kerzendorf, München (DE); Thomas Köhler, München (DE); Andreas Langmeier, München (DE); Winfried Lohmiller, München (DE)

(73) Assignee: Eads Deutschland GmbH, Munich (DE)

( * ) Notice: Subject to any disclaimer, the term of this patent is extended or adjusted under 35 U.S.C. 154(b) by 576 days.

(21) Appl. No.: 09/907,513

(22) Filed: Jul. 17, 2001

(65) Prior Publication Data

US 2002/0016641 A1 Feb. 7, 2002

(30) Foreign Application Priority Data

Jul. 18, 2000 (DE) ................ 100 35 281

(51) Int. Cl.
*G05B 13/02* (2006.01)

(52) U.S. Cl. .............. 700/36; 700/28; 700/29; 700/30; 700/34

(58) Field of Classification Search ........... 700/28–30, 700/32, 36, 34
See application file for complete search history.

(56) References Cited

U.S. PATENT DOCUMENTS

| | | | | |
|---|---|---|---|---|
| 5,115,391 A | * | 5/1992 | Puthenpura et al. | 700/32 |
| 5,587,987 A | * | 12/1996 | Okabe | 369/126 |
| 5,663,891 A | | 9/1997 | Bamji et al. | 364/490 |
| 5,745,735 A | * | 4/1998 | Cohn et al. | 703/6 |
| 5,781,432 A | * | 7/1998 | Keeler et al. | 700/44 |
| 5,892,190 A | * | 4/1999 | Morita et al. | 187/382 |
| 5,903,461 A | * | 5/1999 | Rostoker et al. | 700/121 |
| 5,991,525 A | * | 11/1999 | Shah et al. | 703/2 |
| 6,078,688 A | * | 6/2000 | Cox et al. | 382/173 |
| 6,115,700 A | * | 9/2000 | Ferkinhoff et al. | 706/13 |
| 6,125,235 A | * | 9/2000 | Padilla et al. | 703/11 |
| 6,188,964 B1 | * | 2/2001 | Reister et al. | 702/17 |
| 6,216,048 B1 | * | 4/2001 | Keeler et al. | 700/44 |
| 6,278,899 B1 | * | 8/2001 | Piche et al. | 700/44 |
| 6,336,050 B1 | * | 1/2002 | Amin et al. | 700/28 |
| 2002/0099585 A1 | * | 7/2002 | Locke | 705/7 |

FOREIGN PATENT DOCUMENTS

| | | |
|---|---|---|
| DE | 4114804 | 11/1992 |
| DE | 4326487 | 3/1994 |
| DE | 19717596 | 10/1998 |
| FR | 2704667 | 11/1994 |

\* cited by examiner

*Primary Examiner*—Anthony Knight
*Assistant Examiner*—Ronald D. Hartman, Jr.
(74) *Attorney, Agent, or Firm*—Ladas & Parry LLP

(57) ABSTRACT

Method for determining a state variable x from at least one sensor value by a cost function prepared for a measured value y for implementation in an arithmetic unit of a sensor system having at least one sensor and wherein the cost function depends on the respective state x to be measured and gives a deviation of an actual measured value from the calibration as a function of state x in order to determine the sought state x from this minimum. For the cost function, at least one approximation function is set up on the basis of at least one approximation region within the state region x, by which an approximation of the cost function is carried out with approximation functions with negligible error, wherein the sums of the approximation regions cover the entire relevant state region, and at least all local minima are determined on the basis of the approximation, in a selection of approximation regions, wherein optionally a global minimum is determined from the comparison of local minima.

20 Claims, 2 Drawing Sheets

SENSOR SYSTEM AND METHOD FOR DETERMINING SYSTEM STATES

BACKGROUND OF THE INVENTION

The invention relates to a sensor system and a method for determining system states, referred to as states hereafter.

In systems, whose state variables are to be determined by means of at least one sensor of a sensor system with an associated arithmetic unit, the determination of these variables, which is as accurate as possible from at least one measurement per time point, is of great importance for the functioning capacity of the system. This applies particularly to systems that are critical to safety, for example, air data systems of an airplane, since with insufficient accuracy of the measured values, addition means such as, additional sensors, are necessary in order to achieve the required safety of the overall system. Additional examples are found in the determination of states for chemical and nuclear reactions or in navigation for the determination of position from several measurements that are input, such as GPS or radar systems.

In systems with sensor systems having at least one sensor and an arithmetic unit assigned to this sensor for determining at least one state variable of the system, methods are known, which assign a specific state variable to the measured value of the sensor, optionally as a function of other parameters of the system, by means of inverting a one-dimensional calibration curve of a sensor. For example, in the case of an air data system of an airplane, the measurement of the instantaneous flight state is conducted by means of air data sensors, which measure, for example, static and dynamic pressures in the vicinity of the fuselage. State variables of the undisturbed flow, such as, flow angle, Mach number, and dynamic pressure, are determined from these measured values by means of the one-dimensional inversion of the previously determined calibrations of the measurement as a function of a state, thus, for example, a pressure measurement as a function of static pressure.

It is a disadvantage of this method that the one-dimensional inversion of multidimensional calibrations permits only an imprecise determination of states. Stability problems may also occur.

Therefore, a method has been developed for an air data system, in which a determination of the instantaneous state variables x of the system is carried out from at least one sensor signal by means of a cost function $c^2(x, y, u)$, which comprises calibration curves or surfaces, in order to optimize the precision and reliability of the states x to be determined. This method is disclosed, for example, in (Friehmelt H., Jost, M., Flush Air Data System-Advanced air data system for air and space travel, DGLR [German Association of Air and Space Travel], Annual conference 1999, Berlin, presentation 99–180, page 5). Calibration curves or surfaces of sensor signal y, which is generally a vector and is dependent on the sought state variable x and known configurations or inputs from controlling means u are used in this method.

In the case of the air data system, for which this method is proposed, x represents the air data a, b, $q_c$ and $p_s$, y represents the pressure measurements, i.e., the measured values, and u represents airplane configurations, thus system-dependent parameters.

In order to determine the instantaneous state variables x in the proposed air data system, a minimization of the cost function $c^2(x, y, u)$ is proposed by means of a gradient descent method. The cost function $c^2(x_0, y, u)$ is reduced starting from a randomly selected initialization $x_0$ of the state through a recursive variation of x along the gradient of $c^2$ until a local minimum of $c^2$ with respect to x is obtained.

The disadvantage of this method is that several iteration cycles are necessary in order to obtain the global minimum, in which the computation time of the system is increased. It is also a disadvantage that the obtaining of a global minimum of $c^2$ cannot be guaranteed. The described method is particularly disadvantageous in those cases in which the calibration surfaces can be a highly fractured. This occurs in an air data system, e.g., in transonic systems.

SUMMARY OF THE INVENTION

It is thus an object of the invention to provide a method for implementation in a measurement system as well as a measurement system, which further optimizes and guarantees the determination of the state variable from a measured value.

According to the invention a method for determining a state variable x from at least one sensor value by means of a cost function prepared for a measurement value y for implementing in an arithmetic unit of a sensor system with at least one sensor, wherein the cost function depends on the respective state x to be measured and indicates the deviation of an actual measured value from the calibration as a function of the state x in order to determine from this minimum the sought state x, hereby characterized in that At least one approximation function based on at least one approximation region within the state region x is set up for the cost function, by means of which an approximation of the cost function results with approximation functions with negligible error, wherein the sums of the approximation regions cover the entire relevant state region, all local minima are determined on the basis of the approximation, at least in a selection of approximation regions, and optionally a determination of the global minimum results from the comparison of local minima.

DETAILED DESCRIPTION

Figure 1:
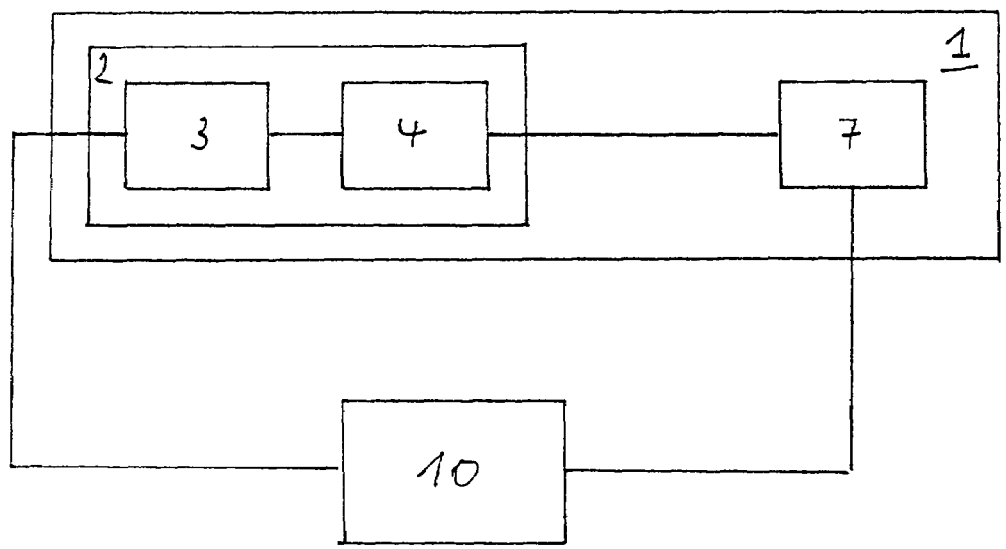
FIG. 1 is a schematic representation of a system with a sensor system, for which the method according to the invention is provided.
Figure 2:
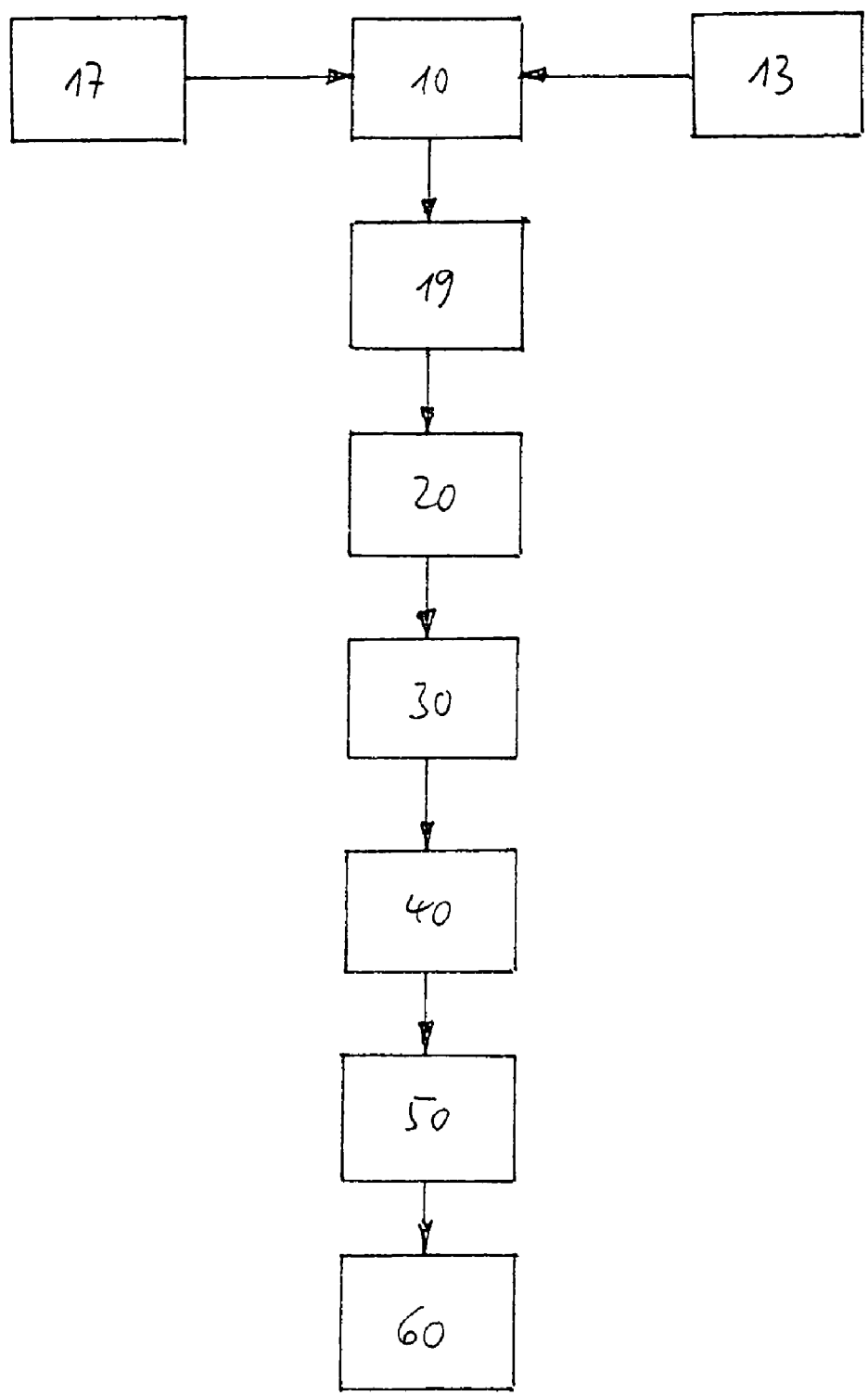
FIG. 2 is a representation of a sequence of the method steps according to the invention.

In FIG. 1, there is seen a sensor system 2 provided with at least one sensor 3 and an arithmetic unit 4. Sensor 3 supplies at least one measured value, from which arithmetic unit 4 determines one or more state variables. The method according to the invention is implemented in arithmetic unit 4 and may also comprise a control device for controlling states or state variables of system 1. Arithmetic unit 4 produces control signals or commands for a control unit 7 in order to change at least one state variable of system 1. A change of the system state, which is designated by reference numeral 10, is again detected by at least one sensor 3.

System 1 can be provided for a multiple number of applications, e.g., the determination of state variables of an airplane from pressure measurements, the determination of concentrations or temperatures for chemical processes, determining position in navigation by comparison of different GPS or radar distance measurements, or determining deformations and forces in structural systems.

For conducting the method according to the invention, calibration surfaces or curves, which have been determined by means of tests and which represent a functional relationship by which measured or sensor values are determined from at least one state variable, and which are used in a cost function, are stored in arithmetic unit 4.

The cost function $c^2$ (x, y, u) is formed in a method step, preferably in arithmetic unit 4 in such a way that it indicates the deviation of an actual measured value from the calibration curves or surfaces, referred to as calibrations hereafter, as a function of the unknown state. In this way, the cost function may contain a weighting of a deviation of the measured value from the calibration that is based on the accuracy of the measured value or calibration. The values x, y and u that are used are preferably vector quantities.

For an air data system of an airplane, the cost function may be present, for example, in the following form:

$$c^2 = [y - (c_p q_c + p_s)]_T [Cov(c_p) q_c^2 + s_p^2]^{-1} [y - (c_p q_c + p_s)].$$

Here, y values are pressure measurements, $c_p(x, u)$ are previously determined calibration curves or surfaces in the form of a functional relationship and $Cov(c_p)(x, u)$ are previously determined accuracies of calibration surfaces. The state x is formed from the air data a, b, $q_c$ and $p_s$, and $s_p$ describes the pressure transducer accuracy of the pressure openings.

A corresponding functional relationship between measured values and system states is filed in a storage unit for each application for the method according to the invention and is introduced together with the system parameters u in a step 13 for the formation of the cost function of arithmetic unit 4. Further, the respective measurement 17 is introduced into the arithmetic unit. This cost function is to be newly prepared for each measurement y, thus, e.g., in each time step, since it depends on the respective measured values y and optionally on the relevant system parameter u each time.

The minimum of the cost function is determined as follows for each cost function of a measurement:

Preferably, prior to running the method of the invention or in system 1, an approximation function of the cost function is established, which is constituted such that minima of the cost function can be determined. Alternatively, several approximation functions in different state regions can be available for selection during the method according to the invention, and these are selected in a step 19. The approximation function based on the established type of function for approximation regions preferably established prior to running the process is set up in a step 20. The determination of the approximation regions depends on the cost function and the selected approximation function as well as a maximally tolerable error over the entire relevant state region. The sum of the approximation regions thus covers the entire relevant state region. Thus, only one approximation region can be provided for the entire relevant state region.

If, alternatively, the approximation region is established in the course of the method according to the invention or in system 1, the approximation regions are adapted within the state region x in a step 30. This is done by a recursive procedure, whereby, for example, another available approximation function is used or the approximation region is reduced. In this way, the sets can be based on the known methods of neuronal networks.

The number of approximation regions used in the determination of the minimum may also be reduced with the use of special, e.g., quadratic approximation functions, if it can be excluded that a minimum cannot be present in several approximation regions.

In all approximation regions in which minima can be found, all minima are then determined in this approximation region in a step 40.

Insofar as several local minima have been determined in the relevant state region, a determination of the global minimum from the comparison of the local minima is made in a state determination 25 in a step 50. Therefore, the global minimum of $c^2$ (X) is identified by a comparison of the cost functions $c^2$ (x) of all local minima x over all approximation regions. The subsequent state determination 60 then determines the state variable x that belongs to the respective measured value. In the example of air data measurement, the result of this minimization is the sought air data vector x with air data a, b, $q_c$ and $p_s$.

Preferably, the approximation function as well as the division of the cost function into approximation regions is established in the method according to the invention. Appropriate functional precautionary measures can be made available in arithmetic unit 4.

If it is known that a specifically applied approximation function may have only a single minimum in an approximation region, a gradient method by means of a random start vector or one that is established by an approximation in the respective approximation region is advantageous for determining the local minimum in an approximation region. Alternatively, a halving method or a comparable method may also be applied.

In corresponding approximation functions, in which several minima may be present in the relevant approximation region of the grid point in question, analytical methods for determining the minimum may be used according to the invention. For example, a quadratic approximation function of the cost function permits the analytical determination of the minimum of the cost function in the respective approximation region. Similar analytic determinations of minima are also possible with cosine and sine approximation functions.

Proceeding from a random start vector $x_0$ in the respective approximation region, the minimum may then be formed by the sum of the start vector $x_0$ and a weighted difference of the measurement value from the calibration as a function of the start vector. Concretely, this may result with the following calculation step for the example of an air data system:

$$x = x_0 + P\,H\,R^{-1}\,(x_0)\,[y - (c_p\,(x_0) q_{c0} + p_{s0})].$$

The following is given in explanation of this solution step:

The covariance Cov(y) of a suitable number of pressure measurements y as a measurement of accuracy results from the solution of the cost function in step 10:

$$R(x_0) = Cov(y) = q_c^2 Cov(c_p)(x_0) + s_p^2.$$

In an additional step, the Jacobi matrix of pressure measurements results by:

$H(x_0) = dy/dx(x_0)$ from the pressure model $y = q_c c_p(x) + p_s$.

Further, the covariance or accuracy of air data x can be determined by:

$$P(x_0) = Cov(x) = (H_T R^{-1} H)^{-1}.$$

The indicated solution step for the method of the invention for calculating the local minimum from the start vector results therefrom:

$$x = x_0 + P\,H\,R^{-1}\,(x_0)[y - (c_p(x_0) q_{c0} + p_{s0}).$$

In order to save calculation time, the term $P\,H\,R^{-1}(x_0)$ and the calibration surface $c_p(x_0)$ can be filed in the form of a table.

What is claimed is:

1. A method for the determination of an unknown state variable (x) of a system (1) from a measured value (y) for implementation in an arithmetic unit (4) of a sensor system (2), said method comprising the steps of:
   obtaining a measured value (y) from a sensor system (2);
   establishing a cost function which indicates deviation of the measured value (y) from calibration functions as a function of the unknown state variable (x);
   establishing a relevant state region from the measured value (y);
   establishing approximation regions (30) and establishing for each approximation region at least one predetermined approximation function of the cost function in which a sum of the approximation function covers the entire relevant state region;
   determining all local minima (40) of said at least one approximation function of the cost function in each of said approximation regions such that each minimum is determined in a respective approximation region; and
   determining a global minimum (50) by comparing said local minima wherein said global minimum represents the state variable (x) of the system (1).

2. The method as claimed in claim 1, wherein said cost function produces a weighting of deviations of the measured value (y) from the calibration values based on the accuracy of the measured value (y) or the calibration values.

3. The method as claimed in claim 1, wherein said system (1) is an air data system of an airplane, and the cost function is expressed by the relationship:

$$c^2 = [y-(c_p q_c + p_s)]^T [\text{cov}(c_p) q_c^2 + \sigma_p^2]^{-1} [y-(c_p q_c + p_s)].$$

4. The method as claimed in claim 1, wherein each of the local minima is determined from the expression:

$$x = x_0 + PHR^{-1}(x_0)[y-(c_p(x_0) q_{c0} + p_{s0})], \text{ wherein}$$

$$P(x_0) = \text{cov}(x) = (H^T R^{-1} H)^{-1},$$

H$_{(0)}$=dy/dx(x$_0$) from a pressure model expressed by the relationship:

$$y = q_c c_p(x) + p_s, \text{ and}$$

$$R(x_0) = \text{cov}(y) = q_c^2 \text{cov}(c_p)(x_0) + s_p^2.$$

5. The method as claimed in claim 1, wherein the start vector is selected randomly in the respective approximation region.

6. The method as claimed in claim 1, wherein said approximation regions are established from a quadratic approximation of the cost function.

7. The method as claimed in claim 1, wherein the approximation functions are established such that each of the approximation functions yields only one minimum.

8. The method as claimed in claim 1, wherein the approximation function and the approximation region are produced in a recursive method prior to the step of establishing the cost function.

9. The method as claimed in claim 1, wherein all the steps are carried out by the arithmetic unit (4).

10. The method as claimed in claim 1, wherein each minimum approximation function of the cost function in each of said approximation regions is determined in a respective approximation region by a sum of a start vector and a weighted difference of the measured value from calibration values obtained from the calibration function as a function of said start vector.

11. A method for the determination of an unknown state variable (x) from a measured value (y) for implementation in an arithmetic unit (4) of a sensor system (2), said method comprising the steps of:
    obtaining a measured value (y) from a sensor system (2);
    establishing a cost function which indicates the deviation of the measured value (y) from calibration functions as a function of the unknown state variable (x);
    establishing a relevant state region from the measured value (y);
    selecting an approximation function of the cost function from a selection of approximation functions of the cost function;
    establishing a selection of approximation regions (30) from the approximation function selected from the selection of approximation functions in which the sum of the approximation regions covers the entire relevant state region;
    determining all local minima (40) within the selection of approximation regions within the state region such that each minimum is determined by a sum of a start vector and a weighted difference of the measured value from the calibration as a function of said start vector, and
    determining a global minimum (50) by comparing said local minima wherein said global minimum represents the state variable (x) of the system (1).

12. The method as claimed in claim 11, wherein said cost function produces a weighting of deviations of the measured value (y) from the calibration values based on the accuracy of the measured value (y) or the calibration values.

13. The method as claimed in claim 11, wherein said system (1) is an air data system of an airplane, and the cost function is expressed by the relationship:

$$c^2 = [y-(c_p q_c + p_s)]^{T[\text{cov}}(c_p) q_c^2 + \sigma_p^2]^{-1} [y-(c_p q_c + p_s)].$$

14. The method as claimed in claim 11, wherein each of the local minima is determined from the expression:

$$x = x_0 + PHR^{-1}(x_0)[y-(c_p(x_0) q_{c0} + p_{s0})], \text{ wherein}$$

$$P(x_0) = \text{cov}(x) = (H^T R^{-1} H)^{-1},$$

H$_{(0)}$=dy/dx(x$_0$) from a pressure model expressed by the relationship:

$$y = q_c c_p(x) + p_s, \text{ and}$$

$$R(x_0) = \text{cov}(y) = q_c^2 \text{cov}(c_p)(x_0) + s_p^2.$$

15. The method as claimed in claim 11, wherein the start vector is selected randomly in the respective approximation region.

16. The method as claimed in claim 11, wherein said approximation regions are established from a quadratic approximation of the cost function.

17. The method as claimed in claim 11, wherein the approximation functions are established such that each of the approximation functions yields only one minimum.

18. The method as claimed in claim 11, wherein the approximation function has minima determined by means of analytical methods.

19. The method as claimed in claim 11, wherein the approximation function and the approximation region are produced in a recursive method prior to the step of establishing the cost function.

20. The method as claimed in claim 11, wherein all the steps are carried out by the arithmetic unit (4).

* * * * *